US 12,262,395 B2

(12) United States Patent
Ye et al.

(10) Patent No.: US 12,262,395 B2
(45) Date of Patent: Mar. 25, 2025

(54) SIDELINK CONTROL INFORMATION PROCESSING

(71) Applicant: Apple Inc., Cupertino, CA (US)

(72) Inventors: Chunxuan Ye, San Diego, CA (US); Weidong Yang, San Diego, CA (US); Oghenekome Oteri, San Diego, CA (US); Chunhai Yao, Beijing (CN); Dawei Zhang, Saratoga, CA (US); Haitong Sun, Irvine, CA (US); Hong He, Cupertino, CA (US); Jie Cui, San Jose, CA (US); Wei Zeng, San Diego, CA (US); Yang Tang, Cupertino, CA (US); Yuchul Kim, Santa Clara, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/455,448

(22) Filed: Aug. 24, 2023

(65) Prior Publication Data
US 2023/0403725 A1    Dec. 14, 2023

Related U.S. Application Data

(62) Division of application No. 17/053,278, filed as application No. PCT/CN2019/116235 on Nov. 7, 2019, now Pat. No. 11,778,638.

(51) Int. Cl.
*H04W 72/25* (2023.01)
*H04L 1/00* (2006.01)
*H04L 1/1829* (2023.01)

(52) U.S. Cl.
CPC .......... *H04W 72/25* (2023.01); *H04L 1/0057* (2013.01); *H04L 1/0067* (2013.01); *H04L 1/0071* (2013.01); *H04L 1/1854* (2013.01)

(58) Field of Classification Search
None
See application file for complete search history.

(56) References Cited

U.S. PATENT DOCUMENTS

| 2018/0069664 A1 | 3/2018 | Khoryaev |
| 2018/0159668 A1 | 6/2018 | Phuyal |

(Continued)

FOREIGN PATENT DOCUMENTS

| CN | 110098898 | 8/2019 |
| WO | 2019195505 | 10/2019 |

OTHER PUBLICATIONS

International Search Report and Written Opinion for Application No. PCT/CN2019/116235; Jul. 24, 2020.

(Continued)

*Primary Examiner* — Nguyen H Ngo
(74) *Attorney, Agent, or Firm* — Kowert, Hood, Munyon, Rankin & Goetzel, P.C.

(57) ABSTRACT

Embodiments are presented herein of apparatuses, systems, and methods for a vehicle-to-everything (V2X) capable wireless device configured to perform sidelink cellular communications. The wireless device performs sidelink communications using a two-stage sidelink control information (SCI) protocol including Stage 1 SCI messaging carried on a physical sidelink control channel (PSCCH), and Stage 2 SCI messaging carried on a physical sidelink shared channel (PSSCH). The SCI messaging may be encoded using polar codes. Channel interleaving is utilized on the SCI to interleave the SCI between two or more layers of a MIMO transmission system. Scrambling for Stage 2 SCI messaging is performed based on the result of a cyclic redundancy check (CRC) performed on Stage 1 SCI messaging. Collisions between sidelink HARQ feedback to be transmitted to (Continued)

a base station and other transmissions are avoided based on a priority analysis of the sidelink HARQ feedback.

20 Claims, 8 Drawing Sheets

(56) References Cited

U.S. PATENT DOCUMENTS

| | | | |
|---|---|---|---|
| 2020/0288435 A1 | 9/2020 | Kwak | |
| 2021/0051500 A1 | 2/2021 | Chae | |
| 2021/0067290 A1 | 3/2021 | Chen | |
| 2021/0105126 A1* | 4/2021 | Yi | H04L 1/1671 |
| 2021/0127414 A1 | 4/2021 | Abdoli | |
| 2021/0160844 A1 | 5/2021 | Lin | |
| 2021/0385845 A1* | 12/2021 | Zhao | H04W 72/569 |
| 2022/0264590 A1* | 8/2022 | Han | H04L 1/1854 |
| 2022/0304001 A1* | 9/2022 | Lee | H04W 72/0446 |

OTHER PUBLICATIONS

Asia Pacific Telecom Discussion on SL Mode-1 Resource Allocation 3GPP TSG-RAN WG1 Meeting #98bis R1-1910848; Oct. 8, 2019.

Partial European Search Report for EP Patent Application 20204832.8-1216; Mar. 30, 2021.

Intel Corporation "Sidelink physical structure for NR V2X communication"; 3GPP TSG RAN WG1 Meeting #98bis R1-1910648; Oct. 14, 2020.

Extended European Search Report for EP Patent Application No. 20204832.8; Jul. 16, 2021.

LG Electronics "Discussion on physical layer structure for NR sidelink"; 3GPP TSG RAN WG1 #98bis R1-1910777; Oct. 14, 2019.

VIVO "Physical layer structure for NR sidelink" 3GPP TSG RAN WG1 #98bis Meeting R1-1911418; Oct. 14, 2019.

Extended European Search Report for EP Patent application 23168174.3; Jul. 7, 2023.

Huawei et al. "Sidelink resource allocation mode 1"; 3GPP TSG RAN WG1 Meeting #98bis R1-1910055; Oct. 14, 2019.

* cited by examiner

|  | URLLC SR | URLLC HARQ-ACK | P/SP-CSI on PUCCH | URLLC PUCCH |
|---|---|---|---|---|
| URLLC SR |  |  |  |  |
| URLLC HARQ-ACK | 01: Reuse the Rel-15 (2 FFS cases) |  |  |  |
| P/SP-CSI on PUCCH | 02: Drop P/SP-CSI | 03: Drop P/SP-CSI |  |  |
| URLLC PUSCH | 04: Reuse the Rel-15 | 05: Reuse the Rel-15 (1 FFS case) | 06: Drop P/SP-CSI |  |
| eMBB AR | 07: Drop lower-priority SR | 08: Drop SR | 09: Reuse the Rel-15 | 10: Drop SR |
| eMBB HARQ-ACK | 11: Drop HARQ-ACK | 12: Drop lower-priority HARQ-ACK | 13: Reuse the Rel-15 | 14: Drop HARQ-ACK |
| eMBB PUSCH | 15: Drop PUSCH | 16: Drop PUSCH | 17: Reuse the Rel-15 | 18: Drop lower-priority PUSCH |

FIG. 5

SIDELINK CONTROL INFORMATION PROCESSING

PRIORITY INFORMATION

This application is a divisional of patent application Ser. No. 17/053,278, entitled "Sidelink Control Information Processing," filed Nov. 5, 2020, which is a national phase filing of Patent Cooperation Treaty (PCT) Application No. PCT/CN2019/116235, titled "Sidelink Control Information Processing", and filed on Nov. 7, 2019, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatuses, systems, and methods for wireless devices to utilize sidelink control information (SCI) in vehicle-to-everything (V2X) wireless cellular communications.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), networks, and other wireless communications devices for various purposes, such as to coordinate traffic activity, facilitate autonomous driving, and perform collision avoidance.

V2X systems may utilize sidelink communications, wherein two or more V2X systems communicate with each other without routing their communications through an intermediary or a network. Effective utilization of sidelink communications may present unique challenges due to the absence of the network in the communication chain or other reasons. Accordingly, improvements in the field are desirable.

SUMMARY

Embodiments are presented herein of apparatuses, systems, and methods for performing sidelink communications in vehicle-to-everything (V2X) wireless cellular communications.

In some embodiments, a wireless device may perform sidelink communications using a two-stage sidelink control information (SCI) protocol. The two-stage SCI protocol may include Stage 1 SCI messaging carried on a physical sidelink control channel (PSCCH), and Stage 2 SCI messaging carried on a physical sidelink shared channel (PSSCH). The Stage 1 and Stage 2 SCI messaging may be encoded using polar codes.

In some embodiments, channel interleaving may be utilized on the Stage 2 SCI messaging to interleave the Stage 2 SCI messaging between two or more layers of a MIMO transmission system. Channel interleaving may be performed either before or after scrambling and modulation is performed. Channel interleaving may be selectively performed based on a modulation order of the polar code, based on whether 2 or more layers are utilized in the PSSCH, based on a mapping of modulation symbols to the two or more layers, and/or based on a pre-configuration of a resource pool utilized by the wireless device.

In some embodiments, scrambling for Stage 2 SCI messaging may be performed based at least in part on the result of a cyclic redundancy check (CRC) performed on received Stage 1 SCI messaging. In some embodiments, scrambling for PSSCH data messaging may be performed based at least in part on the result of a CRC performed on received Stage 2 SCI messaging.

In some embodiments, collisions between sidelink HARQ feedback to be transmitted to a base station and other transmissions may be avoided based on a priority analysis of the sidelink HARQ feedback.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 5 is a table of example priority rankings of different types of uplink transmissions, according to some embodiments;

Figure 1:
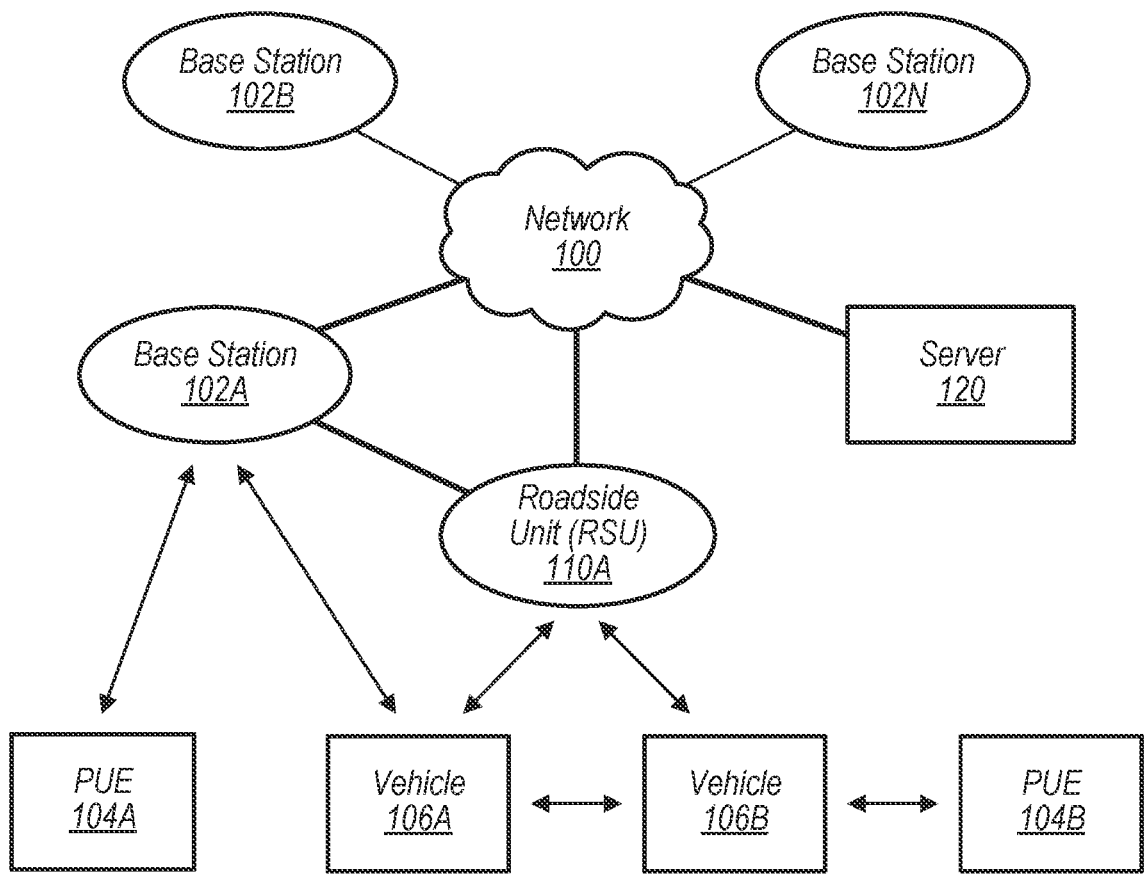
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems or devices that are mobile or portable and that perform wireless communications. Examples of UE devices include mobile telephones or smartphones (e.g., iPhone™ Android™-based phones), portable gaming devices (e.g., Nintendo DS™, PlayStation Portable™, Gameboy Advance™, iPhone™), laptops, wearable devices (e.g. smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) installed within the vehicle or carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing said wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer communications may utilize a "sidelink" interface such as the PC5 interface in the case of some LTE embodiments, and may generally be referred to as "sidelink communications". In certain LTE embodiments, the PC5 interface supports direct cellular communication between user devices (e.g., between vehicles 106), while the Uu interface supports cellular communications with infrastructure devices such as base stations. The LTE PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. For example, NR V2X sidelink communication techniques can also be used to perform device-to-device communications, at least according to some embodiments. Note also that some user devices in a V2X system (e.g., PUE 104A, as one possibility) may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an 'eNodeB', or eNB. Note that if the base station 102A is implemented in the context of NR, it may alternately be referred to as an 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may also be capable of communicating with the base station 102A. The user devices shown, i.e., user devices 104A, 104B, 106A, and 106B may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, etc.), and/or other wireless communication protocols. In some embodiments, RSU 110A may be able to communicate with devices using a sidelink technology such as LTE PC5 or NR V2X sidelink communication techniques.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
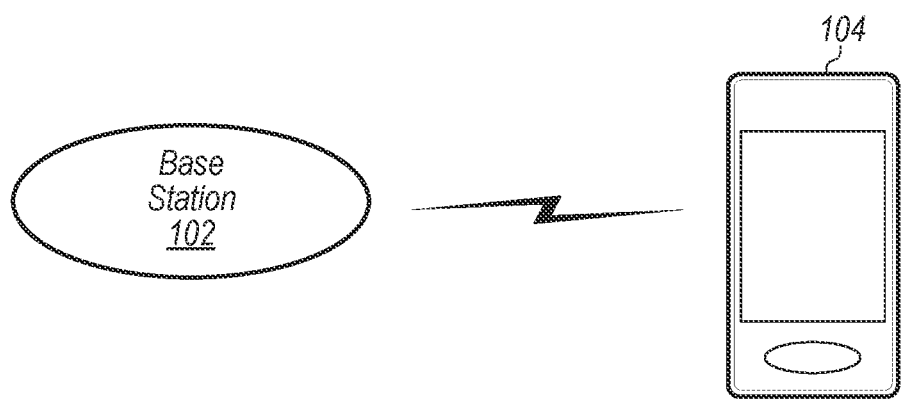
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B and/or a UE device comprised within a vehicle 106A or 106B in FIG. 1) in communication with a base station 102 (e.g., the base station 102A in FIG. 1), according to some embodiments. The UE 104 may be a device with cellular communication capability such as a mobile phone, a hand-held device, a computer or a tablet, or virtually any type of portable wireless device.

The UE 104 may include a processor that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array) that is configured to perform any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using either of LTE or 1×RTT (or LTE or GSM), and separate radios for communicating using each of Wi-Fi and Bluetooth. Other configurations are also possible.

Figure 3:
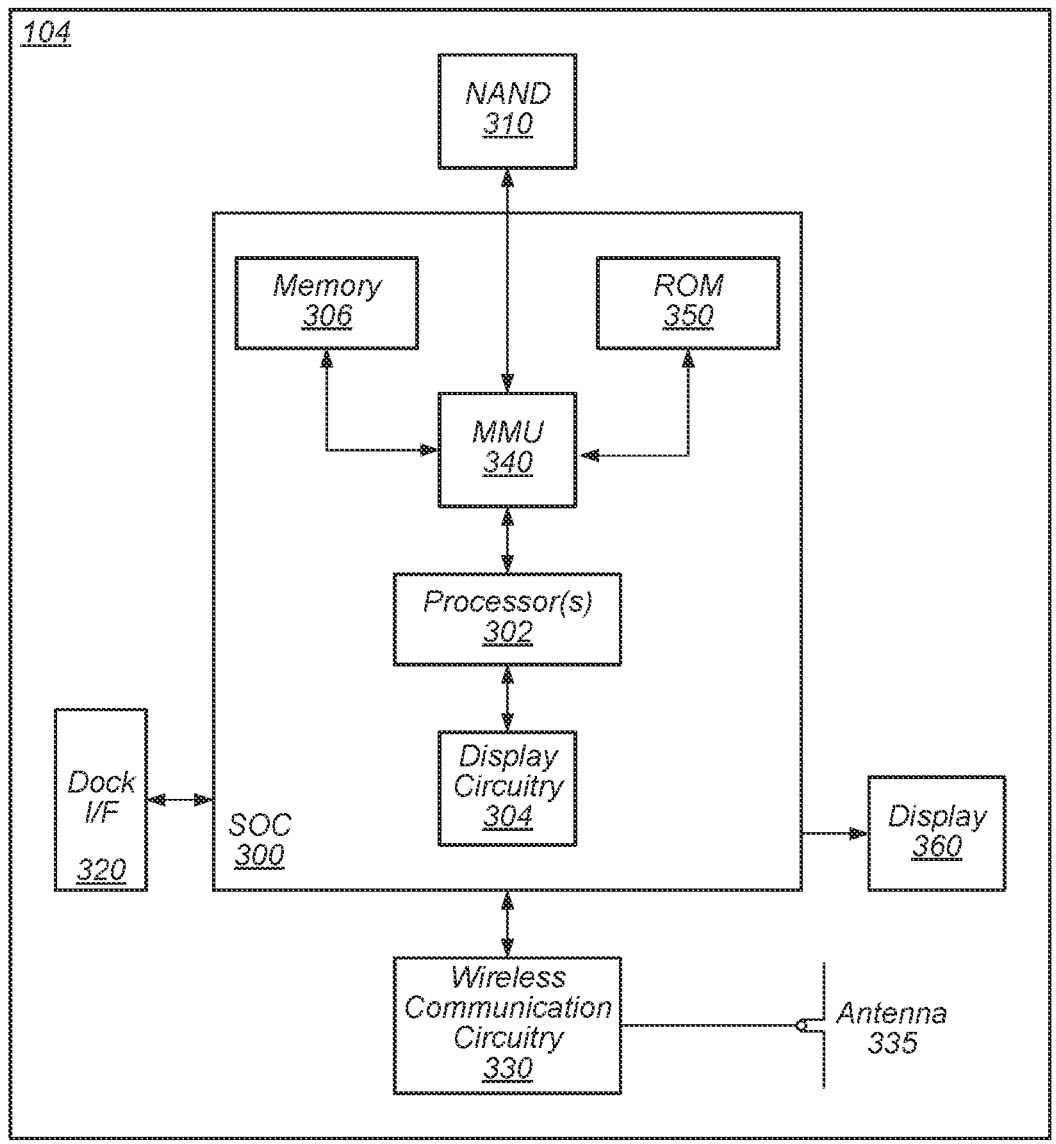
FIG. 3 is an example block diagram of a UE, according to some embodiments.

FIG. 3—Block Diagram of a UE

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing unicast sidelink access stratum level connection maintenance, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
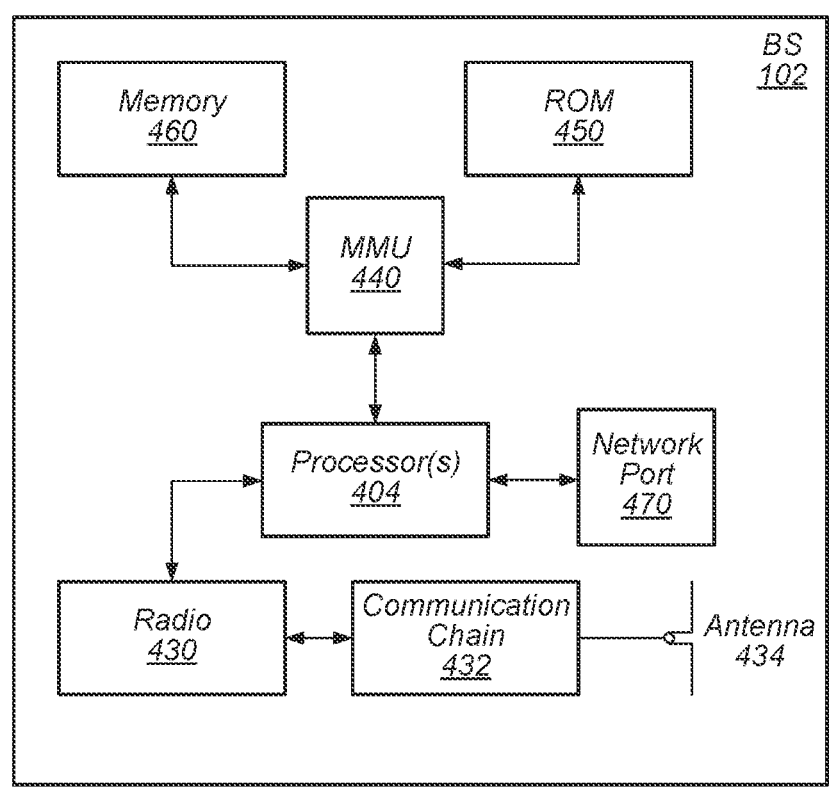
FIG. 4 is an example block diagram of a base station, according to some embodiments.

FIG. 4—Block Diagram of a Base Station

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmablde hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Sidelink Communications

In wireless communications, specifically cellular wireless communications, sidelink communications represent a special kind of communication mechanism between devices that is not carried through a base station, e.g., through an eNB/gNB. In other words, the devices communicate with each other without that communication going through a base station. In one sense, the devices may be said to be communicating with each other directly. Accommodation of such communication, however, may utilize new physical layer designs and protocols.

Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, categorized into four groups: vehicle platooning, extended sensors, advanced driving, and remote driving. Platooning is a cooperative driving application according to which multiple vehicles travel in the same lane as in a convoy, keeping a specified (preferably constant) inter-vehicle distance between each other in order to increase their traffic efficiency, e.g. to reduce fuel consumption and gas emissions and to achieve safe and efficient transport. To achieve platooning, vehicles in a platoon may use multiple on-board sensors (e.g., radars, lidars—light detection and ranging, positioning systems, etc.) and sidelink vehicle-to-vehicle communications to synchronize their on-road operations, e.g. pertaining to breaking, changing lanes, stopping, etc. Vehicle platooning may utilize both groupcast transmissions (e.g. for relaying status information for platoon management) and unicast transmissions (e.g. for communication between two members). Efficient intra-platooning communications and inter-platooning communications may help achieve better spectrum/power efficiency while maintaining fair resource competition, e.g. between members of the same platoon and also between platoons, (consequently, between members of different platoons).

In C-V2X, multiple resource allocation modes may be employed for sidelink communications, with different mechanisms for allocating sidelink communication resources. For example, C-V2X may utilize "mode 1", whereby sidelink communication resources are allocated by the network (NW) (for example, through dynamic scheduling or semi-persistent scheduling (SPS)), or "mode 2", where resource allocation is performed autonomously by the UE (e.g., such that the UE autonomously selects the resources to use for communications), as specified by LTE Release 12. Alternatively or additionally, C-V2X may utilize "mode 3" which operates similar to mode 1 (i.e., sidelink communication resources are allocated by the NW), and "mode 4' which operates similar to mode 2 (i.e., resource allocation is performed autonomously by the UE), as specified by LTE release 14. In this context, "resource allocation" may be understood to refer to the allocation of one or both of time slots and/or frequency slots (e.g., subcarriers) for use in performing sidelink communications. The resources may be allocated within one or more "pools", in some embodiments. For example, a "mode 2 pool" of time slots and corresponding subcarrier frequencies may be configured by a base station, wherein the mode 2 pool describes the set of time and frequency resources available for performing mode 2 sidelink communications. Additionally or alternatively, an "exceptional pool" may be utilized by a UE during a transition from RRC Idle to RRC Connected, and a "pre-configured pool" may be pre-configured for a UE to use, in certain circumstances.

In some embodiments, a dual-mode UE (or mixed-mode UE) may be utilized, whereby the UE is able to switch between mode 1 and mode 2 operation. Advantageously, a dual-mode UE may be employed without introducing backwards-compatibility issues with other UEs, as the receiving UE may be transparent to the transmitting mode used. For example, if a 5GNR-V2X UE supports dual-mode operation, it may apply it even to LTE V2X R14 transmissions. For example, it may alternate mode selection to transmit basic safety messages (BSM) in a R14 format.

In some embodiments, a UE may only be capable of communicating according to one mode at one time. For example, at one time, all sidelink transmissions may be of the same mode. Alternatively, in some embodiments a UE may support simultaneous dual-mode operation, whereby at one time some sidelink transmissions are done in mode 1, and other sidelink transmissions are done in mode 2.

Two-Stage Sidelink Control Information in V2X

V2X communications operating through the 5G NR radio access technology may support a two-stage sidelink control information (SCI) protocol, including both Stage 1 SCI messaging and Stage 2 SCI messaging. In this protocol, Stage 1 SCI messaging may be carried on a physical sidelink control channel (PSCCH), and may include transmissions specifying radio resources (e.g., time and/or frequency resources) being utilized or reserved by vehicles and other devices in a V2X environment. It is expected that polar codes, adopted for NR downlink control information (DCI), may be applied to Stage 1 SCI transmissions on the PSCCH. Stage 2 SCI messages may be carried on a physical sidelink shared channel (PSSCH), and may include sidelink hybrid automatic repeat request (HARQ) feedback between sidelink devices, among other types of transmissions. Embodiments herein present methods and devices to improve performance for two-stage SCI protocols.

The polar coding protocols used for the physical downlink control channel (PDCCH) may be applied to Stage 2 SCI messaging, and the scrambling operations for Stage 2 SCI may be applied separately for the PSSCH. The PSSCH may be further utilized for data transfers between V2X devices, and in some embodiments Stage 2 SCI messaging may be interlaced with resource elements (REs) utilized for data transfers in the PSSCH. Alternatively, Stage 2 SCI messaging may utilize REs that are not interspersed with REs utilized for data transfers. Modulation for Stage 2 SCI messaging may utilize quadrature phase shift keying (QPSK), or alternatively it may utilize the same modulation scheme as data messages transferred over the PSSCH.

In some embodiments, the PSSCH may utilize multiple layers for transmitting and receiving information. For example, a V2X-capable device may utilize a multiple-input multiple-output (MIMO) radio, and different transmit antennas may be separately allocated to a first transmission layer and a second transmission layer. When the PSSCH has two layers, the same modulation symbol of the 2nd stage SCI may be mapped to the two layers, different modulation symbols of the 2nd stage SCI may be mapped to the two layers, or a combination thereof may be employed, in various embodiments.

In some embodiments, V2X sidelink communications may operate autonomously between peer devices without scheduling and direction from a base station. Because of the lack of coordination from the base station, collisions (e.g., resource conflicts) may arise between different V2X transmissions. To mitigate collisions, different types of V2X communications may incorporate a priority ranking to determine which types of communications take precedence during a potential collision. FIG. 5 is a table illustrating an example priority ranking for ultra-reliable low latency communications (URLLC) scheduling requests (SR), URLLC HARQ acknowledgment (ACK) messaging, periodic/semi-persistent (P/SP) channel state information (CSI) on the physical uplink control channel (PUCCH), and URLLC on the physical uplink shared channel (PUSCH) for Release 16. As illustrated, FIG. 5 shows which procedure should be followed during a resource collision between different pairs of communication types. In some cases, the priority ranking from Release 15 (Rel-15) may be used. P/SP CSI may always have low priority, and aperiodic CSI (A-CSI) priority may depend on the priority of the PUSCH carrying the A-CSI (not illustrated).

Given the state of SCI messaging in V2X systems, embodiments herein present methods and devices to improve functionality in these environments. For example, the physical layer processing of SCI stage 2 messaging may include modulation, resource mapping, and layer mapping, and some embodiments herein present methods and devices to maintain a specified level of SCI stage 2 polar coding performance for any given modulation, resource mapping and layer mapping. Additionally, some embodiments present implementations for the scrambling sequence for PSSCH and/or designs for the PSSCH demodulation reference signal (DMRS) sequence. The scrambling sequence for SCI stage 2 may be different from the scrambling sequence for sidelink data transmissions, in some embodiments. Additionally, for environments where a V2X-capable device is operating in an in-coverage or partial coverage scenario (i.e., when it is communicating with a base station to facilitate V2X sidelink communications), the device may transmit sidelink HARQ feedback on the PUCCH and/or the PUSCH, which may potentially conflict with other transmissions such as other uplink transmissions. In these cases, embodiments herein present methods and devices to mitigate these collisions.

Channel Interleaver Applied to SCI Stage 2

Typically, channel interleaving is not utilized for communications on the PDCCH, because modulation for polar coding DCI on the PDCCH is QPSK, and there is typically no difference between the reliability of the two bits in a QPSK symbol. Further, a single layer is typically applied to PDCCH transmissions. The PSSCH, on the other hand, utilizes two layers, and embodiments herein present methods for mapping different modulation symbols of Stage 2 SCI messaging to the two layers. In these embodiments, layer 1 may generally have a better signal-to-interference-plus-noise ratio (SINR) than layer 2. Accordingly, coded bits allocated to layer 1 may be better protected than the coded bits allocated to layer 2.

In some embodiments, fading patterns during transmission for polar encoded bits may result in polar decoding performance degradation. When the modulation order of the 2nd stage SCI is same as that used for PSSCH data transmission, a high order modulation (e.g., 16QAM or 64 QAM or 256 QAM) may be applied to the polar encoded bits to improve performance. The coded bits allocated to the most significant bits (MSBs) of modulation symbols may be better protected than the coded bits allocated to the least significant bits (LSBs) of modulation symbols.

To address these and other concerns, in some embodiments, a channel interleaver may be utilized for Stage 2 SCI messaging to randomize deep fading of the polar encoded bits between the two layers. The channel interleaver may be applied after polar encoding and rate matching, in some embodiments. In various embodiments, channel interleaving may be applied before or after scrambling and/or before or after modulation is performed. Various types of channel interleavers may be utilized, including but not limited to a triangular interleaver, a block interleaver, or two or more parallel block interleavers with interlacing combining.

In some embodiments, a Stage 2 SCI message may have attached thereon a cyclic redundancy check (CRC), which may be a 24-bit CRC or another size CRC. Interleaving of a Stage 2 SCI message and the CRC may be performed to achieve CRC distribution. Polar encoding may be performed with a maximum mother code length of 512 bits or another length of bits, followed by rate matching which may include subblock interleaving on polar coded bits, saving interleaved bits to a circular buffer, selecting a rate matching scheme based on the code rate and the number of rate matching output bits, and selecting bits from the circular buffer based on the rate matching scheme.

Figure 6A:
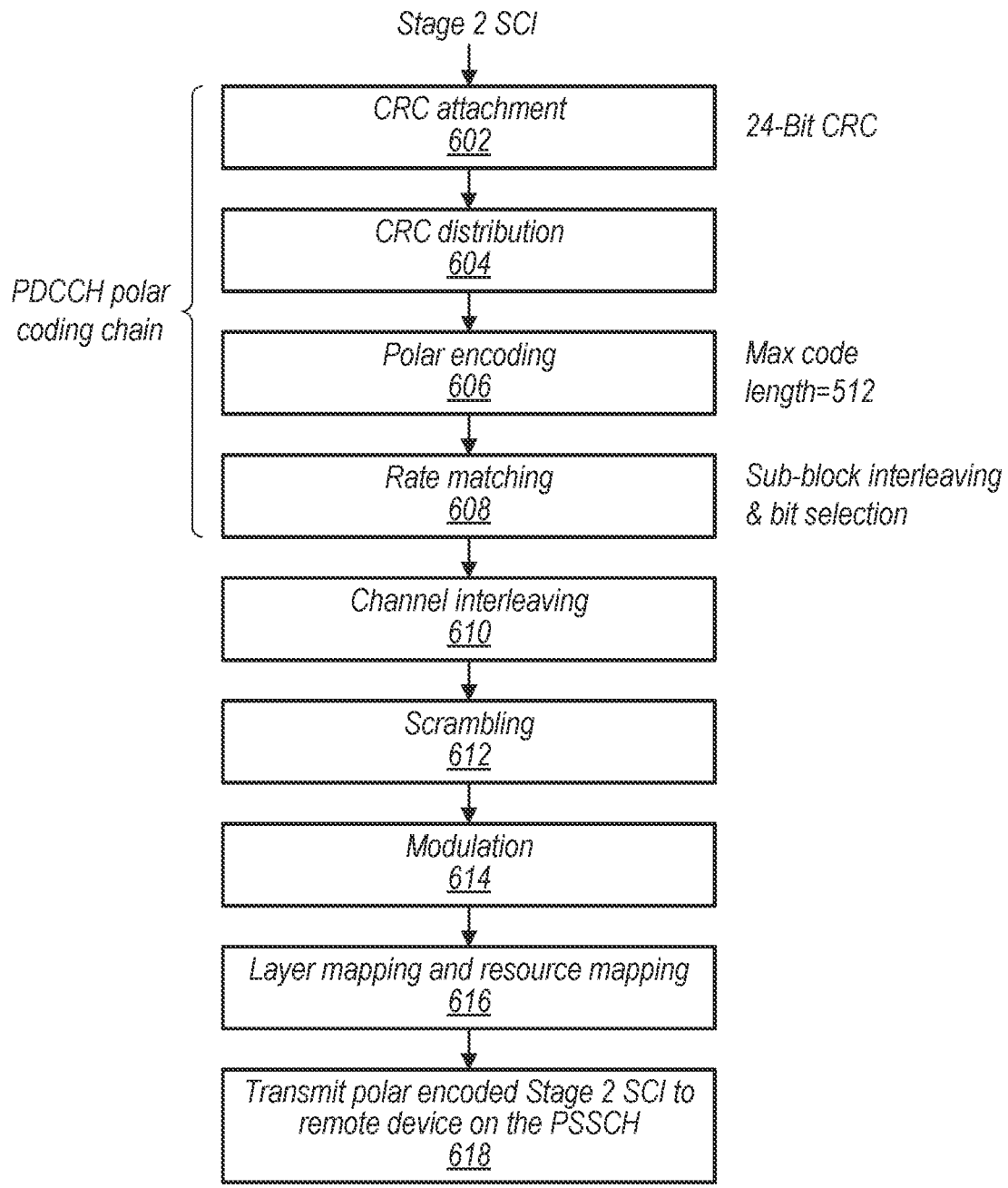
FIG. 6A is a flowchart diagram illustrating a transmitter-side method for inserting channel interleaving into a Stage 2 SCI encoding procedure, according to some embodiments.
Figure 6B:
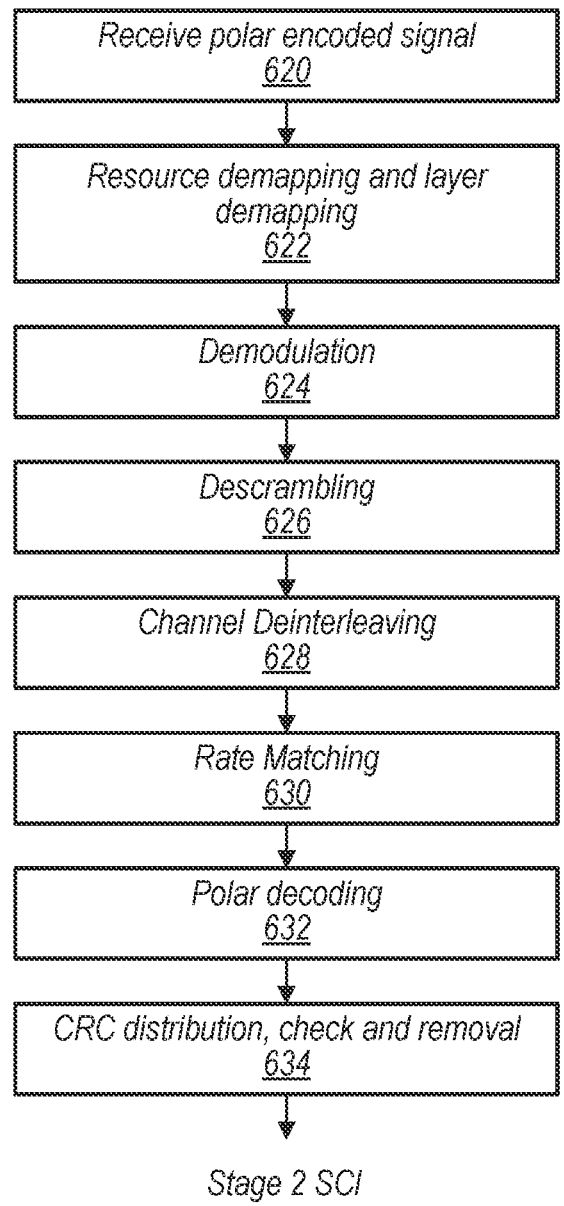
FIG. 6B is a flowchart diagram illustrating a receiver-side method for performing channel deinterleaving into a Stage 2 SCI decoding procedure, according to some embodiments.
Figure 7:
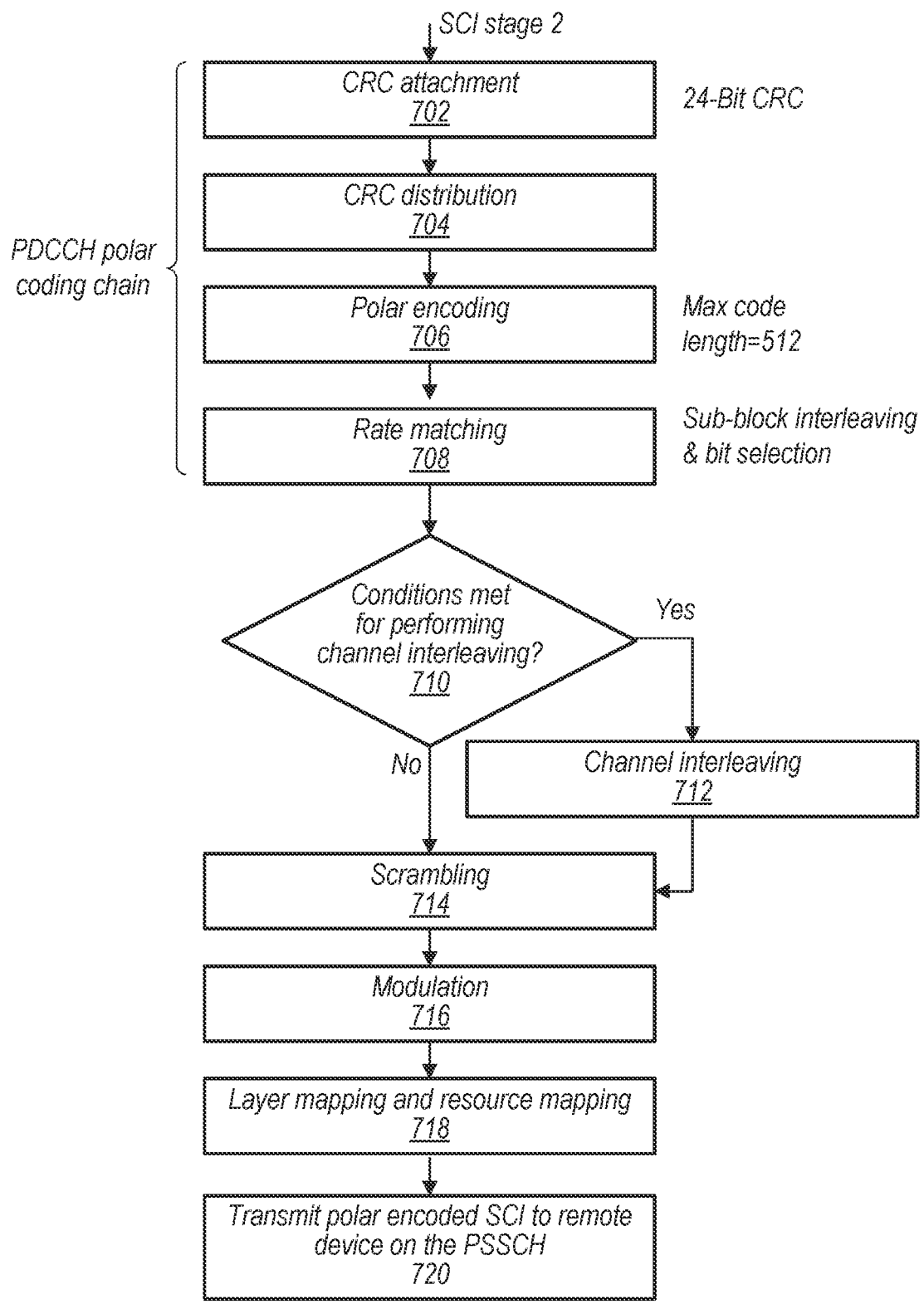
FIG. 7 is a flowchart diagram illustrating a method for selectively inserting channel interleaving into a Stage 2 SCI encoding procedure based on certain conditions, according to some embodiments.

FIGS. 6-7—Flowchart for Channel Interleaving and Scrambling Design

FIG. 6A is a flowchart diagram illustrating a transmitter-side method for inserting channel interleaving into a Stage 2 SCI encoding procedure, according to some embodiments. The Stage 2 SCI may be associated with a two-stage SCI protocol associated with 5G NR communications, in some embodiments. The method described in FIG. 6A may be performed by a wireless device configured with at least one antenna for performing wireless communications, a radio coupled to the at least one antenna, and a processor coupled to the radio. The wireless device may be comprised within a vehicle, in some embodiments. In various embodiments, some of the elements of the methods shown may be performed concurrently, in a different order than shown, may be substituted for by other method elements, or may be omitted. Additional method elements may also be performed as desired. As shown, the method may operate as follows.

The wireless device may have sidelink control information (SCI) to be polar encoded and transmitted as a Stage 2 SCI message. As described in greater detail below, steps 602-608 may proceed similarly to a standard polar coding chain for PDCCH communications.

At 602, upon initialization of Stage 2 SCI encoding, cyclic redundancy check (CRC) bits may be attached to the SCI to be encoded. As illustrated, the CRC may be a 24 bit CRC, although other lengths of CRC bits may also be used, as desired.

At 604, the CRC may be distributed throughout the SCI, according to standard polar encoding protocols.

At 606, polar encoding may be performed on the SCI message to obtain polar encoded SCI.

At 608, rate matching may be performed on the polar encoded SCI according to standard protocols, to match the bit rate of the message to be transmitted to a desired bit rate.

At 610 channel interleaving may be performed. The channel interleaving may utilize triangular interleaving, which may reuse the NR uplink control information (UCI) polar coding protocol, for example, by setting $I_{BIL}$ equal to one. Alternatively, block interleaving or parallel block interleaving with interlacing combining may be utilized. Channel interleaving may distribute the polar encoded SCI between the two or more layers of the MIMO antenna system of the wireless device.

At 612 scrambling may be performed on the polar encoded SCI. In some embodiments, scrambling for Stage 2 SCI messaging may be performed at least in part in response to the result of a CRC performed on Stage 1 SCI messaging. For example, the wireless device may determine the result of a CRC performed on an SCI message associated with Stage 1 and received by the wireless device from a remote device over the PSCCH. As described in greater detail below, the Stage 2 SCI may be scrambled based on a random or pseudorandom number such as a Gold sequence, and this pseudorandom number may be initialized based on an initialization value that is determined based at least in part on the result of the CRC performed on the received Stage 1 SCI. In some embodiments, the wireless device may utilize one or more other values to initialize the pseudorandom sequence. For example, the wireless device may use one or more of an identifier of the remote device or an identifier of the wireless device to obtain an initialization value for use in scrambling the Stage 2 SCI message.

While step 612 describes embodiments related to scrambling a Stage 2 SCI message based on the result of a CRC performed on a Stage 1 SCI message, other embodiments are also possible. For example, the CRC may be performed on a Stage 2 SCI message received from the remote device over the PSSCH, and the result of the CRC may be utilized to determine an initialization value for scrambling a data message to be transmitted over the PSSCH. In these embodiments, an identifier of one or both of the wireless device and the remote device may additionally or alternatively be utilized to determine the initialization value for scrambling the data message. Additionally or alternatively, the wireless device may scramble a demodulation reference signal (DMRS) based on an initialization value determined from a result of the CRC performed on a received Stage 1 SCI, and may transmit the scrambled DMRS to the remote device over the PSSCH.

At 614, modulation may be performed according to any desired modulation scheme to modulate the SCI prior to transmission.

While FIG. 6A shows scrambling and modulation occurring after channel interleaving, in various embodiments channel interleaving may be performed after scrambling and before modulation, or after each of scrambling and modulation. In other words, the ordering of steps 610-614 may be altered such that step 610 occurs anywhere within the sequence.

At 616, layer mapping and resource mapping may be performed.

At 618, the polar encoded sidelink information may be transmitted to a remote device according to the channel interleaving on a physical sidelink shared channel (PSSCH).

FIG. 6B is a flowchart diagram illustrating a receiver-side method for performing channel deinterleaving during a Stage 2 SCI decoding procedure, according to some embodiments. The Stage 2 SCI may be associated with a two-stage SCI protocol associated with 5G NR communications, in some embodiments. The method described in FIG. 6B may be performed by a wireless device configured with at least one antenna for performing wireless communications, a radio coupled to the at least one antenna, and a processor coupled to the radio. The wireless device may be comprised within a vehicle, in some embodiments. In various embodiments, some of the elements of the methods shown may be performed concurrently, in a different order than shown, may be substituted for by other method elements, or may be omitted. Additional method elements may also be performed as desired. As shown, the method may operate as follows.

At 620, a polar encoded message may be received by a radio of the wireless device. The polar encoded message may be received wirelessly from a peer device using a cellular technology such as 5G NR, and may be received over a sidelink connection.

At 622, resource demapping and layer demapping may be performed on the received message.

At 624, demodulation may be performed on the received message. Demodulation may be performed according to any desired modulation scheme, such as QAM or QPSK, among other possibilities.

At 626, the received message may be descrambled.

At 628, channel deinterleaving may be performed on the received message.

At 630, rate matching may be performed on the received message.

At 632, polar decoding may be performed on the received message to obtain a decoded message.

At 634, CRC distribution, check and removal may be performed on the decoded message, to determine whether the wireless device is the intended recipient of the received message. If the CRC is successful, the wireless device may proceed to process the decoded Stage 2 SCI message.

FIG. 7 is a similar flowchart to FIG. 6A, except FIG. 7 describes embodiments where channel interleaving is selectively applied based on certain conditions. The method described in FIG. 6A may be performed by a wireless device configured with at least one antenna for performing wireless communications, a radio coupled to the at least one antenna, and a processor coupled to the radio. The wireless device may be comprised within a vehicle, in some embodiments. In various embodiments, some of the elements of the methods shown may be performed concurrently, in a different order than shown, may be substituted for by other method elements, or may be omitted. Additional method elements may also be performed as desired. As shown, the method may operate as follows.

Steps 702-708 may proceed similarly to corresponding steps 602-608 of FIG. 6A, described above.

At 710, it may be determined whether conditions or met for performing channel interleaving. Any of a variety of conditions, or combinations of conditions, may be used for determining whether to perform channel interleaving, according to various embodiments. For example, in some embodiments, channel interleaving is applied if the PSSCH has a high order modulation such as 16 QAM of higher order modulation. More generally, the wireless device may determine whether the PSSCH utilized a modulation order higher than a threshold order, and channel interleaving may be performed based at least in part on this determination.

Alternatively or additionally, channel interleaving may be applied if the PSSCH has 2 or more layers and different modulation symbols of Stage 2 SCI are mapped to these two or more layers. In some embodiments, channel interleaving may not be applied if the PSSCH utilizes a low order modulation such as QPSK modulation and/or if the PSSCH has 1 layer, and/or if the PSSCH has 2 or more layers but the same modulation symbols of Stage 2 SCI are mapped to these 2 or more layers.

In some embodiments, channel interleaving may be selectively applied based on a pre-configuration of the wireless device and a peer device. For example, the wireless device may conduct communications with the peer device to determine a pre-configuration associated with a resource pool used to communication with the peer device. The wireless device may determine whether the resource pool used to communication with the peer device supports channel interleaving. In these embodiments, channel interleaving may be performed at least in part in response to determining that the pre-configuration associated with the resource pool used for communication with the remote device supports channel interleaving. In various embodiments, the pre-configuration may be specified per resource pool and/or per ProSe sidelink radio resource control (PC5-RRC) configuration.

At 712, if it is determined that one or more conditions are met for performing channel interleaving, channel interleaving is performed according to the description above in reference to step 610 of FIG. 6A.

At 714-718, scrambling, modulation, layer mapping and resource mapping may be performed, similar to steps 612-616 described above in reference to FIG. 6A. However, steps 714-718 may alternatively be performed without also performing channel interleaving (e.g., if conditions for performing channel interleaving are not met) or in conjunction with channel interleaving (i.e., if the conditions are met). Similar to FIG. 6A, while steps 714 and 716 are illustrated as taking place after steps 710 and 712, channel interleaving (and the decision whether to perform channel interleaving) may alternatively occur before or after either of scrambling and modulation, as desired.

At 720, the polar encoded sidelink information may be transmitted to a remote device according to the channel interleaving on a physical sidelink shared channel (PSSCH).

Scrambling Sequence Design for SCI Messaging

In some embodiments, methods and devices may be utilized to enhance the scrambling sequence design for Stage 2 SCI messaging on the PSSCH. The following paragraphs provide further details on the scrambling step performed, for example, at steps 612 and 714 of FIGS. 6 and 7, respectively.

Polar codes may typically utilize a pseudorandom sequence (such as a Gold sequence or another type of pseudorandom sequence) for scrambling, and the pseudorandom sequence may be seeded with an initialization value. In some embodiments, scrambling for Stage 2 SCI messaging may utilize an initialization value that is based at least in part on the result of a cyclic redundancy check (CRC) performed over the PSCCH, such as a Stage 1 SCI CRC, for example. In various embodiments, either part (e.g., the LSBs or MSBs) or all of the PSCCH CRC bits may be used to determine the initialization value. Additionally or alternatively, the initialization value may depend on a destination ID (e.g., an ID of the peer device) or combination of the destination ID and the PSCCH CRC.

As one specific example, the initialization value $C_{init}$ for the Stage 2 SCI may be computed as follows:

$$C_{init} = N_{ID} * 2^7 + N_{Const},$$

where $N_{ID}$ is the 24-bit PSCCH CRC and $N_{Const}$ is a constant value.

Another example for computing count is as follows:

$$C_{init} = N_{ID} * 2^{10} + N_{Const},$$

where $N_{ID}$ represents the 21 (MSB or LSB) bits of the PSCCH CRC and $N_{Const}$ is a constant value between 1008 and 1023.

In some embodiments, the initialization value for scrambling data messaging on the PSSCH may be determined based at least in part on the destination ID, the source ID (i.e., an identifier of the transmitting wireless device), the PSCCH CRC, and/or the Stage 2 SCI CRC. As one example, $C_{init}$ for data messaging on the PSSCH may be computed as follows:

$$C_{init} = N_{ID} * 2^{24} + N_{destinationID} * 2^8 + N_{sourceID},$$

where $N_{ID}$ represents the 7 (MSB or LSB) bits of the Stage 2 SCI CRC, $N_{destinationID}$ is the destination ID (which may be 16 bits in some embodiments) and $N_{sourceID}$ is the source ID (which may be 8 bits in some embodiments).

In some embodiments, the initialization value for scrambling demodulation reference signals (DMRSs) on the PSCCH may be determined based at least in part on the result of the PSCCH CRC (or the Stage 1 SCI CRC). Similar to the Stage 2 SCI messaging, either part (e.g., the LSBs or MSBs) or all of the PSCCH CRC bits may be used to determine the initialization value for the DMRS. Alternatively, the destination ID or a combination of destination ID and the PSCCH CRC may be utilized to determine the initialization value.

Note that in some embodiments the source ID may not be usable to generate the initialization value for scrambling the PSSCH DMRS sequence, as it may be contained in Stage 2 SCI, which is typically decoded by using the PSSCH DMRS sequence for channel estimation. An example equation for calculating the initialization value for scrambling the DRMS sequence is as follows:

$$C_{init} = (2^{10} * (14 n_{s,f} + l + 1)(2 * N_{ID} + 1) + N_{ID}) \bmod 2^{31},$$

where $N_{ID}$ is the 10 (MSB or LSB) bits of the PSCCH CRC, l is the OFDM symbol number within a slot, and $n_{s,f}$ is the slot number within a radio frame.

Avoiding Sidelink HARQ Feedback Collisions

In some embodiments, a wireless device such as a V2X-capable wireless device may perform sidelink communications in an in-coverage or partial coverage scenario, and the wireless device may report sidelink HARQ feedback to the base station (e.g., the eNB or the gNB). In these embodiments, timing for transmitting sidelink HARQ feedback may be indicated to the wireless device by the base station through DCI messaging. Adversely, sidelink HARQ feedback may be scheduled such that it may collide with other uplink or downlink transmissions, including UL or DL HARQ messaging, scheduling requests (SR), channel state information (CSI) reporting, and/or uplink data transmissions. Further, the multiplexing of sidelink HARQ messaging with uplink control information (UCI) may complicate UE operations. To address these and other concerns, some embodiments propose priority-based handling of sidelink HARQ messaging and other transmissions.

In some embodiments, the priority of sidelink HARQ messaging may be based at least in part on the priority of the associated sidelink data. In some embodiments, there may be up to 8 or more priority levels. Similarly, the priority of downlink HARQ messaging may depend on the priority of associated downlink data, with up to 2 or more priority levels.

In some embodiments, if there is a potential collision between sidelink HARQ messaging transmitted on an UL channel and an uplink data communication, the wireless device may piggyback the sidelink HARQ messaging with the uplink data communication on the PUSCH. It may be understood that 'piggyback' as used herein may refer to transmitting the two communications concurrently as part of a single transmission. Alternatively, the behavior of the wireless device may depend on the relative priority of the sidelink HARQ messaging and the uplink data communication. For example, if the sidelink HARQ messaging and the uplink data communication are of the same priority class, then the wireless device may piggyback the sidelink HARQ messaging with the uplink data communication. If they do not have the same priority class, the wireless device may drop (i.e., the wireless device may refrain from transmitting or postpone transmitting) the communication with the lower priority.

In some embodiments, there may be a potential collision between sidelink HARQ messaging to be transmitted on an UL channel and another type of second transmission. The second transmission may include P/SP CSI reporting on the PUCCH, uplink SR messaging, downlink HARQ messaging, or another type of transmission. In some embodiments, the wireless device may, by default (i.e, without consulting priority), determine to transmit the sidelink HARQ messaging and drop the second transmission. Alternatively, the wireless device may determine its behavior based on the priority of the sidelink HARQ messaging. For example, if the sidelink HARQ priority is higher than a threshold, then the second transmission may be dropped and the sidelink HARQ message may be performed according to the indicated timing. As yet another possibility, the priority of the sidelink HARQ messaging may be compared with the priority of the second transmission, and the higher priority transmission may be performed according to its respective schedule, while the lower priority transmission may be postponed or cancelled. In some embodiments, if both the sidelink HARQ messaging and the second transmission have the same priority, the sidelink HARQ messaging may piggyback on the second transmission, if possible.

Figure 8:
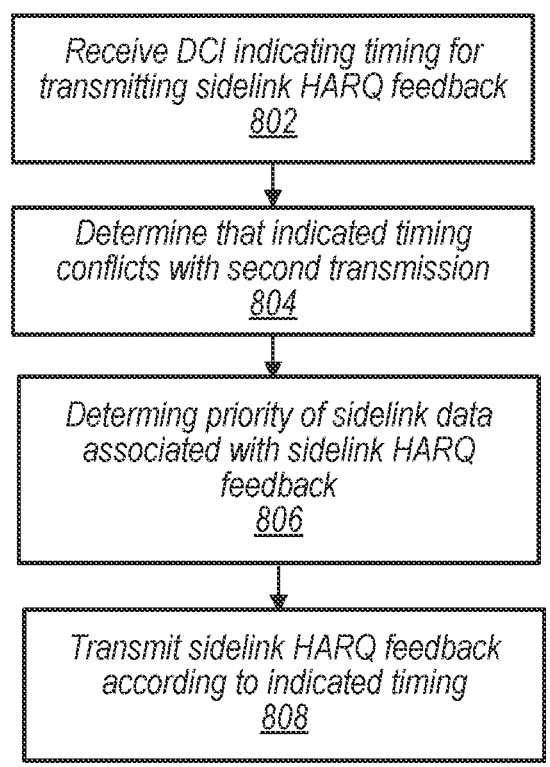
FIG. 8 is a flowchart diagram illustrating a method for avoiding collisions when transmitting sidelink HARQ feedback to a base station, according to some embodiments.

FIG. 8—Flowchart for Priority-Based Sidelink HARQ Collision Mitigation

FIG. 8 is a flowchart diagram illustrating a method for avoiding collisions when transmitting sidelink HARQ feedback to a base station, according to some embodiments. The sidelink HARQ feedback may be associated with 5G NR communications, in some embodiments. The method described in FIG. 8 may be performed by a wireless device configured with at least one antenna for performing wireless communications, a radio coupled to the at least one antenna, and a processor coupled to the radio. The wireless device may be included within a vehicle, in some embodiments. In various embodiments, some of the elements of the methods shown may be performed concurrently, in a different order than shown, may be substituted for by other method elements, or may be omitted. Additional method elements may also be performed as desired. As shown, the method may operate as follows.

At 802, downlink control information (DCI) is received from a base station indicating timing for the wireless device to transmit sidelink hybrid automatic repeat request (HARQ) feedback to the base station. The base station may be an eNB or a gNB, in various embodiments. The DCI may further specify one or more frequency resources for the wireless device to use in transmitting the sidelink HARQ feedback to the base station.

At 804, it is determined that the indicated timing for transmitting the sidelink HARQ feedback conflicts with a second transmission. For example, it may be determined that the sidelink HARQ feedback overlaps in time and/or frequency with a second transmission. The second transmission may be of various types, in either the uplink or downlink direction. For example, the second transmission may include periodic/semi-persistent (P/SP) channel state information (CSI) reporting on an uplink channel, an uplink scheduling request, or a downlink HARQ message, in various embodiments.

At 806, a priority of sidelink data associated with the sidelink HARQ feedback is determined based at least in part on determining that the indicated timing for transmitting the sidelink HARQ feedback conflicts with the second transmission. For example, the wireless device may determine a priority of the sidelink data for which the sidelink HARQ feedback is reporting successful or unsuccessful reception.

At 808, based at least on the priority of the sidelink data, the sidelink HARQ feedback is transmitted to the base station according to the indicated timing. In some embodiments, determining the priority of the sidelink data includes determining whether the priority of the sidelink data is higher than a predetermined threshold. In these embodiments, transmitting the sidelink HARQ feedback according to the indicated timing based at least on the priority of the sidelink data may include transmitting the sidelink HARQ feedback according to the indicated timing based at least in part on the priority of the sidelink data being higher than the predetermined threshold.

In some embodiments, determining the priority of the sidelink data includes comparing the priority of the sidelink data to a priority of the second transmission or a priority associated with the second transmission. In these embodiments, transmitting the sidelink HARQ feedback according to the indicated timing based at least on the priority of the sidelink data includes transmitting the sidelink HARQ feedback according to the indicated timing based at least in part on determining that the priority of the sidelink data is higher than the priority of the second transmission.

In some embodiments, it may be determined that the sidelink data associated with the sidelink HARQ feedback has a same priority class as the second transmission. In these embodiments, transmitting the sidelink HARQ feedback according to the indicated timing may include piggybacking the sidelink HARQ feedback with the second transmission.

In other embodiments, based on a determination that the sidelink data has a lower priority than the second transmission, the wireless device may refrain from transmitting the sidelink HARQ feedback according to the indicated timing. In these embodiments, the wireless device may transmit the second transmission according to its scheduled timing, and may cancel the sidelink HARQ feedback, or alternatively the wireless device may postpone the sidelink HARQ feedback until a future available opportunity.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

As described above, one aspect of the present technology is the gathering and use of data available from specific and legitimate sources to improve coordination of traffic flow in traffic environments. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data may be used to better harmonize traffic flow in the user's environment, such that transportation of the user and other users becomes more efficient. Further, the personal data may improve safety of the user (and other users) by averting traffic accidents, particularly vehicular collisions. For example, in the case of a pedestrian user, the personal information, particularly movement- and position-related information, may operate to avert potentially fatal collisions between vehicles and the user. Also, the personal information may be usable to reduce resource and power consumption by user devices benefitting from traffic-related networks, which may improve users' experiences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data for use in vehicle- and transportation-related networks. In another example, users can select not to provide certain personal data, such as location or movement data, to V2X networks for traffic safety and coordination purposes. In yet another example, users may be able to select to limit the length of time or degree to which traffic-associated data is maintained or entirely block the development of a baseline traffic or vehicle profile. In addition to providing "opt in" and "opt out" options, the present disclosure contemplates providing notifications relating to the access or use of personal information. For instance, a user may be notified that their personal information data will be accessed for use in vehicle and transportation networks.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor configured to, when executing instructions stored in a memory, perform operations comprising:
receiving downlink control information from a base station indicating timing for transmission of sidelink hybrid automatic repeat request (HARQ) feedback to the base station;
determining that the indicated timing for transmitting the sidelink HARQ feedback overlaps, at least in part, with a second transmission, wherein the second transmission comprises an uplink message;
determining, in response to determining that the indicated timing for transmitting the sidelink HARQ feedback overlaps with the second transmission, a priority of the sidelink HARQ feedback; and
based at least on a comparison of the priority of the sidelink HARQ feedback to a threshold,
when sidelink data associated with the sidelink HARQ feedback does not have a same priority class as the second transmission, sending either the sidelink HARQ feedback or the second transmission to an interface with radio frequency (RF) circuitry for transmission to the base station, or
when the sidelink data associated with the sidelink HARQ feedback has the same priority class as the second transmission, sending the second transmission piggybacked with the sidelink HARQ feedback to the interface with the RF circuitry for transmission to the base station.

2. The baseband processor of claim 1, wherein the baseband processor is further configured to, when executing instructions stored in the memory perform operations comprising:
based on a determination that the sidelink HARQ feedback has a lower priority than the threshold, refraining from sending, to the interface with the RF circuitry, the sidelink HARQ feedback according to the indicated timing.

3. The baseband processor of claim 1, wherein the baseband processor is further configured to, when executing instructions stored in the memory perform operations comprising:
determining the priority of the sidelink HARQ feedback is higher than the threshold, and
sending, to the interface with the RF circuitry, the sidelink HARQ feedback according to the indicated timing based at least on determining that the priority of the sidelink HARQ feedback is higher than the threshold.

4. The baseband processor of claim 1,
wherein performing operations comprising sending either the sidelink HARQ feedback or the second transmission to the interface with the RF circuitry for transmission to the base station is performed according to the indicated timing.

5. The baseband processor of claim 1,
wherein the downlink control information further specifies one or more frequency resources for transmitting the sidelink HARQ feedback.

6. The baseband processor of claim 5,
wherein performing the operations comprising determining that the indicated timing for transmitting the sidelink HARQ feedback overlaps with the second transmission comprises performing operations comprising determining that the sidelink HARQ feedback overlaps in time and frequency resources with the second transmission.

7. The baseband processor of claim 1,
wherein the uplink message comprises:
periodic/semi-persistent (P/SP) channel state information (CSI) reporting on an uplink channel; or
an uplink scheduling request.

8. The baseband processor of claim 1,
wherein the baseband processor is comprised within a wireless device.

9. The baseband processor of claim 8,
wherein the wireless device is included within a vehicle.

10. The baseband processor of claim 1,
wherein the base station comprises a g Node B (gNB).

11. A non-transitory computer-readable memory medium comprising program instructions which, when executed by a processor of a wireless device, cause the wireless device to:
- receive downlink control information from a base station indicating timing for transmission of sidelink hybrid automatic repeat request (HARQ) feedback to the base station;
- determine that the indicated timing for transmitting the sidelink HARQ feedback overlaps, at least in part, with a second transmission, wherein the second transmission comprises an uplink message;
- determine, in response to determining that the indicated timing for transmitting the sidelink HARQ feedback overlaps with the second transmission, a priority of the sidelink HARQ feedback; and
- based at least on a comparison of the priority of the sidelink HARQ feedback to a threshold,
  - when sidelink data associated with the sidelink HARQ feedback does not have a same priority class as the second transmission, send either the sidelink HARQ feedback or the second transmission to an interface with radio frequency (RF) circuitry for transmission to the base station, or
  - when the sidelink data associated with the sidelink HARQ feedback has the same priority class as the second transmission, send the second transmission piggybacked with the sidelink HARQ feedback to the interface with the RF circuitry for transmission to the base station.

12. The non-transitory computer-readable memory medium of claim 11, wherein the program instructions are further executable to cause the wireless device to:
- based on a determination that the sidelink HARQ feedback has a lower priority than the threshold, refrain from transmitting the sidelink HARQ feedback according to the indicated timing.

13. The non-transitory computer-readable memory medium of claim 11, wherein the program instructions are further executable to cause the wireless device to:
- determine the priority of the sidelink HARQ feedback is higher than the threshold, and
- transmit the sidelink HARQ feedback according to the indicated timing based at least on determining that the priority of the sidelink HARQ feedback is higher than the threshold.

14. The non-transitory computer-readable memory medium of claim 11,
wherein transmitting either the sidelink HARQ feedback or the second transmission to the base station is performed according to the indicated timing.

15. The non-transitory computer-readable memory medium of claim 11,
wherein the downlink control information further specifies one or more frequency resources for transmitting the sidelink HARQ feedback.

16. A method, comprising:
- receiving downlink control information from a base station indicating timing for transmission of sidelink hybrid automatic repeat request (HARQ) feedback to the base station;
- determining that the indicated timing for transmitting the sidelink HARQ feedback overlaps, at least in part, with a second transmission, wherein the second transmission comprises an uplink message;
- determining, in response to determining that the indicated timing for transmitting the sidelink HARQ feedback overlaps with the second transmission, a priority of the sidelink HARQ feedback; and
- based at least on a comparison of the priority of the sidelink HARQ feedback to a threshold,
  - when sidelink data associated with the sidelink HARQ feedback does not have a same priority class as the second transmission, sending either the sidelink HARQ feedback or the second transmission to an interface with radio frequency (RF) circuitry for transmission to the base station, or
  - when the sidelink data associated with the sidelink HARQ feedback has the same priority class as the second transmission, sending the second transmission piggybacked with the sidelink HARQ feedback to the interface with the RF circuitry for transmission to the base station.

17. The method of claim 16,
wherein the downlink control information further specifies one or more frequency resources for transmitting the sidelink HARQ feedback,
wherein determining that the indicated timing for transmitting the sidelink HARQ feedback overlaps, at least in part, with the second transmission comprises determining that the sidelink HARQ feedback overlaps in time and frequency resources with the second transmission.

18. The method of claim 16,
wherein the uplink message comprises:
- periodic/semi-persistent (P/SP) channel state information (CSI) reporting on an uplink channel; or
- an uplink scheduling request.

19. The method of claim 16, further comprising:
- determining the priority of the sidelink HARQ feedback is higher than the threshold, and
- sending, to the interface with the RF circuitry, the sidelink HARQ feedback according to the indicated timing based at least on determining that the priority of the sidelink HARQ feedback is higher than the threshold.

20. The method of claim 16,
wherein the downlink control information further specifies one or more frequency resources for transmitting the sidelink HARQ feedback.

* * * * *